INVENTORS:
Zbigniew Stachurski
John O'M. Bockris
George Abbe Dalin

BY Karl G. Ross
Attorney

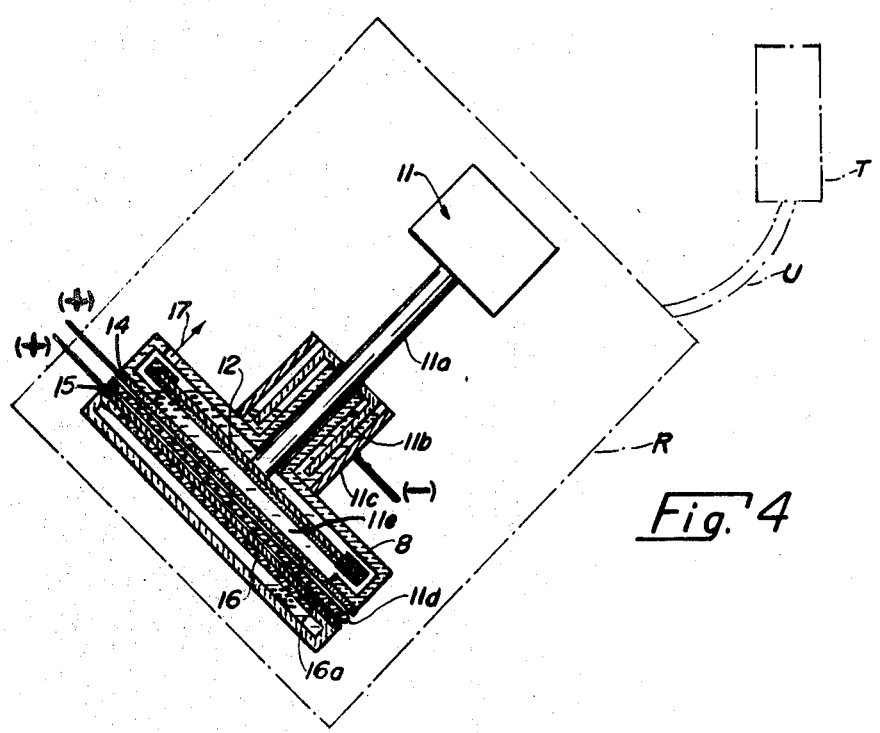
Fig. 4
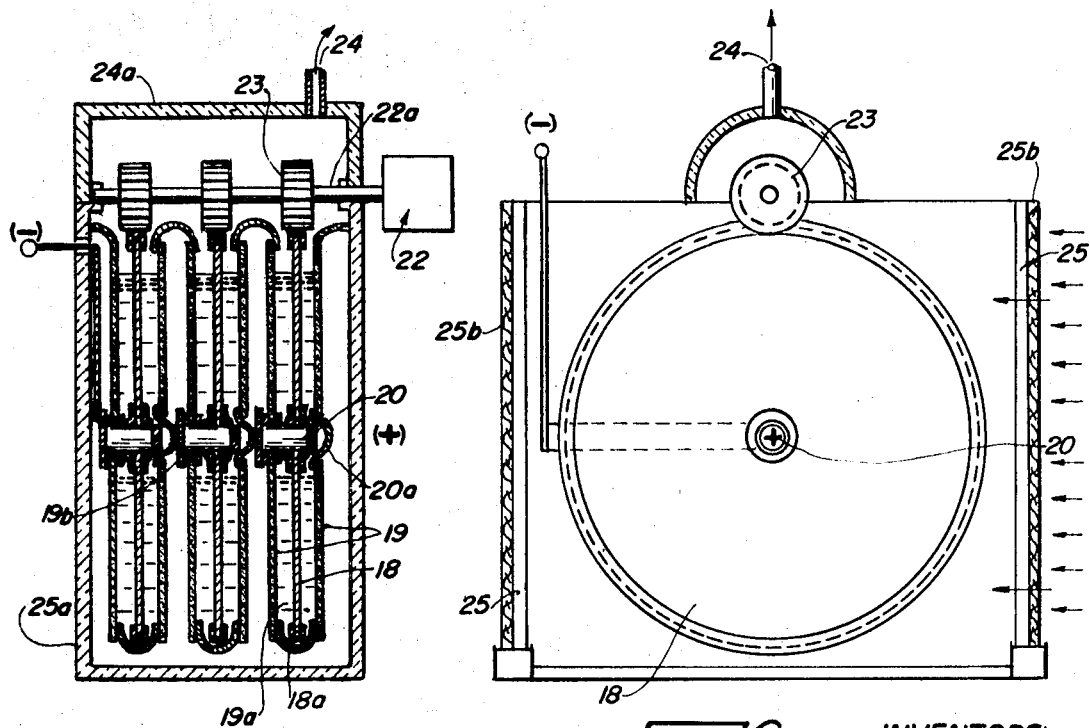
Fig. 5
Fig. 6
INVENTORS:
Zbigniew Stachurski
John O'M. Bockris
George Abbe Dalin
BY Karl J. Ross
Attorney INVENTORS:
Zbigniew Stachurski
John O'M. Bockris
George Abbe Dalin BY Karl F. Ross
Attorney

United States Patent Office 3,560,261
Patented Feb. 2, 1971

3,560,261
METHOD OF TREATING ELECTRODE OF ELECTROCHEMICAL GENERATOR DURING CHARGING
Zbigniew Starchurski, New York, N.Y., John O'M. Bockris, Philadelphia, Pa., and George Abbe Dalin, Union, N.J., assignors to Yardney International Corp., New York, N.Y., a corporation of New York
Continuation of application Ser. No. 441,069, Mar. 19, 1965. This application July 31, 1968, Ser. No. 749,925
Int. Cl. H01m *15/00, 29/04*
U.S. Cl. 136—6                                            3 Claims

ABSTRACT OF THE DISCLOSURE

A rechargeable electrochemical current generator with two electrodes of opposite polarities, having generally planar confronting working surfaces immersed in an electrolyte in which the active material (e.g. zinc) of the negative electrode is soluble, is charged with continuous displacement of the negative electrode in the plane of its working surface, such as rotation about an axis, to prevent the short-circuiting of the system by the growth of dendritic formations from the negative electrode to the positive counterelectrode. A stationary wiper may be held against the working surface of the negative electrode during its rotation to help smooth its active layer.

---

This is a continuation of co-pending application Ser. No. 441,069, filed Mar. 19, 1965, and abandoned.

Our present invention relates to current-producing electrochemical cells and, more particularly, to cells whose efficiency, useful life and applicability depend upon the interaction of one or more electrodes and an electrolyte in contact therewith.

The problem involved in the designing and use of current-producing electrochemical systems are manifold and, apart from structural considerations, derive from the interaction between an active material and the electrolyte between the closely spaced electrodes which, for considerations of high power density (i.e. available power per unit weight or volume), should have a spacing no greater than about 2 cm. When, hereinafter, reference is made to "closely spaced" electrodes, it is intended to refer to electrodes having spacings on the order of millimeters or less to approximately 2 cm. Along the problems of the type described are those concerning redeposition of active material upon one of the electrode surfaces. For example, rechargeable batteries or cells utilizing zinc/zinc-oxide electrodes have been characterized heretofore by a phenomenon designated as "shape change," which is a progressive inactivation and migration of the active material on the active electrode. Such difficulties have been attributed to the formation of concentration gradients within the electrolyte. Moreover, the presence of a diffusion layer adjacent an active electrode frequently renders electrochemical reactions thereat dependent upon the rate of diffusion, thereby limiting the rate at which current can be withdrawn from the cell when the reaction produces electric current, the character of a deposit formed during charging of an electrochemically reversible electrode, the nature of the active-material layer in a primary or single-discharge cell during wet-stand, and the possibility of obtaining a dense but yet porous and uniform active layer of active materials which are not readily deposited in a state suitable for use in such systems. By way of example, it may be noted that the diffusion layer and, more generally, the conditions at the electrode/electrolyte interface can result in the rapid growth of zinc dendrites tending to bridge the interelectrode gap and short-circuit the cell, limits the reaction rate at a fuel electrode or gas-depolarizable electrode, and prevents the use of materials such as lithium and other alkali metals which, as is wellknown, can make available large quantities of energy per unit weight.

It is the principal object of the present invention to provide a current-generating electrochemical system whereby the disadvantageous effects of electrolyte stratification, large-thickness diffusion layers and like efficiency-reducing phenomena can be significantly diminished and the cell life and useful current density improved, while affording a greater measure of control of the electrochemical reactions than possible heretofore.

A more specific object of this invention is to provide a relatively simple but effective method of and system for operating rechargeable current-producing cells and batteries for greatly extended periods without failure resulting from diminished anode capacity or shorting as discussed above.

Our present invention is based, at least in part, upon our discovery that it is possible to control the density and the type of deposit obtained from an electrolyte during charge/discharge cycling of a current-generating cell in such manner as to reduce the tendency for limitedly coherent dendritic structures to bridge the electrodes, by displacing one of the members of the electrode assembly at a rate such that the gradient is substantially reduced and the thickness of the diffusion layer sharply limited. To a certain extent, the reduction of the concentration gradient and the thickness of the diffusion layer appears to be a consequence of the pumping action resulting from movement of one of the electrodes of the cell assembly and, according to an essential feature of this invention, such electrode movement can be effected at a rate at most equal to that at which turbulence tends to develop at the boundary layer but greater than that necessary to ensure the breaking of dendritic bridges which may tend to form between the electrodes. The result is a relative displacement of the electrolyte and the surface of the electrode receiving the deposit; this relative movement affords hydrodynamic control of the deposition action. It has been found, for example, that it is possible to regulate the density and polarity of the deposit at a zinc electrode in an electrochemical cell merely by controlling the speed of this electrode within the electrolyte. Thus, at identical electrolyte concentrations, temperatures and charging-current densities, similar electrode surfaces can receive relatively dense deposits and relatively porous deposits merely by the use of high and low electrode speeds, respectively. While the present invention contemplates the relative movement of the members of a cell assembly with a speed whose lower limit is determined only by the absence of shorting bridges and whose upper limit is determined only by the desirability to obtain a porous layer of active material within the current-generating cell, it has been found to be desirable to select limits for the speeds such that the density of the deposit is at least 15% of that of the solid material and at most 90% thereof. These limits afford good results in terms of the porosity and tenacity of the active layers.

It has been suggested by others that the disadvantageous effects of depletion of the electrolyte can, on a macroscopic scale, be reduced by circulating the electrolyte at relatively high rates, and such an arrangement is disclosed and claimed in the commonly assigned, copending applications Ser. No. 140,384 of Sept. 25, 1961, now Patent No. 3,257,241 granted June 21, 1966 and Ser. No. 379,920 of July 2, 1964, now Patent No. 3,247,024 granted Apr. 19, 1966. These and similar arrangements have, however, the disadvantage that loose dendrites may be broken off the electrochemically reversible electrode by the mechanical action of the electrolyte stream and carried to locations in which their accumulations could cause shorting independently of the normal growth of dendrite bridges; moreover, removing dendrites mechanically from the rechargeable electrode results in a gradual loss of capacity of the system, while such recirculation requires considerable expenditure of energy, complex liquid-circulation systems and pumping arrangements, and relatively wide interelectrode spacings to ensure the necessary high flow rates.

We have discovered that the problem of electrolyte depletion and limited ion mobility in the electrolyte can be obviated and the deposit of active metal in dendritic form controlled so as to prevent bridging when a preferably rechargeable electrochemical system of the general character described is provided with drive means for displacing one of the electrodes relatively to the other and preferably in the plane of or parallel to the electrode surface upon which the active material deposits in a porous layer generally transversely to this surface. We have found, moreover, that this arrangement ensures a more uniform deposition of the active material because of increased access of the active-metal ions to the electrode surface, and that the layer remains uniform even after many charge/discharge cycles without showing any tendency toward the "shape change" arising from electrolyte stratification, even though such stratification would normally be present in the interelectrode gap. The movement of the reversible electrode, for example, can be effected without significant mechanical dislodgment of the active material.

While dendritic zinc has been discussed hereinabove as an important active material for a current-generating electrochemical system and as highly prone to destructive phenomena adapted to be obviated by the use of displaceable electrode means according to the present invention, it will be understood that other active materials can also be employed. For example, tin may be substituted for zinc while deposition of lithium (e.g. from nonaqueous and other electrolytes) can also be carried out. The alkaline systems described for the deposition of zinc may be replaced by acid systems when other active materials are to be deposited, the gas or air electrodes preferably including noble metals (e.g. silver, gold, metals of the platinum group) in combination with antiwetting agents and especially hydrophobic resins (e.g. polytetrafluoroethylene) and/or carbon. Auxiliary electrodes serving for charging the electrochemically reversible electrode can include nickel, stainless steel and other inert metals in the form of grids, rods, plates, disks, and the like. The depolarizing gases can include halogen (e.g. chlorine and fluorine) in addition to air or pure oxygen. The present invention thus affords the possibility of a lithium/fluorine cell of high available power per unit weight or volume. The fluorine can thus be the depolarizer of a gas electrode while lithium is deposited at an active electrode and is discharged thereon.

As will be apparent hereinafter, the phenomenon with which the present invention is principally concerned is most evident with high-speed movement of the electrodes. For example, advantageous results are obtained with a disk having a diameter of 5 cm. which is rotated at a speed ranging from about 100 r.p.m. to about 1400 r.p.m. It has been found by Z. Stachurski, one of the present joint inventors, that uniform deposits can be obtained without the corresponding reduction in the thickness of the diffusion layer by the co-operation of the electrode upon which the active material is deposited and a wiper means displaceable relatively thereto. That invention is described and claimed in copending application Ser. No. 441,265, now Patent No. 3,440,098 granted Apr. 22, 1969 filed concurrently herewith.

The above and other objects, features and advantages of the present invention will become more readily apparent from the following description, reference being made to the appended drawing in which:

FIG. 4 is an axial cross-sectional view somewhat diagrammatically illustrating a rotary-electrode oxygen-depolarized cell having a centrally driven electrode member and a gas-depolarized counterelectrode;

FIG. 5 is an axial cross-sectional view of an arrangement wherein the movable electrodes are peripherally driven;

FIG. 6 is an end view of the battery of FIG. 5;

Figure 3:
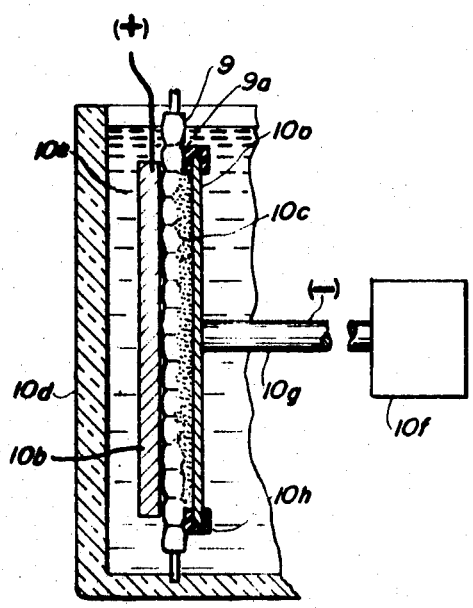
FIG. 3 is a side-elevational view of the electrode assembly of a rotatable-electrode cell according to another embodiment of the invention.
Figure 3A:
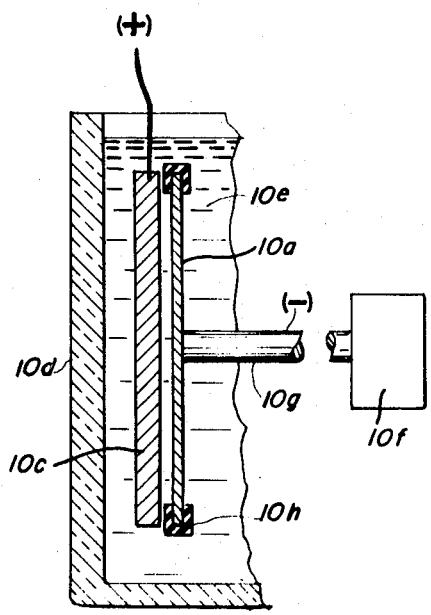
FIG. 3A is a view similar to FIG. 3 of a cell omitting the wiper of FIG. 3.

Referring first to FIGS. 3 and 3A of the drawing, it will be seen that the basic elements of a battery or cell according to the present invention are a movable electrode 10a, which is here shown as a disk of a current-collecting sheet material (steel, copper, silver-plated steel, etc.), and a counter-electrode 10b. As previously described, the present invention is most advantageous when the counterelectrode is a gas-depolarized electrode; member 10b can thus consist of a catalyst-containing porous plate to which a depolarizing gas is supplied as described in the commonly assigned copending application Ser. No. 409,324, filed Nov. 5, 1964 by Maurice Lang and entitled Fuel-Cell Electrode. It is also possible to employ, as counterelectrodes for the zinc/zinc-oxide electrode 10a, gas-depolarized electrodes containing noble-metal catalysts as described in commonly assigned application Ser. No. 125,779, filed July 21, 1961, now Patent No. 3,219,486, granted Nov. 23, 1965, and even electrodes consisting predominently of hydrophobic resins (polytetrafluorethylene) and catalytically effective noble materials (e.g. gold, silver and metals of the platinum group). The present invention may also make use of rechargeable or electrochemically reversible cathodes of the type conventionally employed in a current-producing couple with a zinc/zinc-oxide anode; of most significance in this regard are silver/silver-oxide and nickel/nickel-oxide electrodes. The electrochemically reversible anode 10a of FIG. 3 is adapted to receive, upon charging of the electrochemical system against the counterelectrode 10b or an auxiliary electrode (e.g. of nickel or stainless steel) as mentioned above, a layer 10c of dendritic crystals which normally grow in a direction perpendicular to the surface upon which they are deposited and in the direction of the opposite electrode. In the absence of special precautions, the dendritic growths span the interelectrode gap and short circuit the cell. The cell may be provided with the usual housing 10d which encloses an electrolyte 10e from which the metal is deposited upon charging. In the case of zinc/zinc-oxide electrodes, the electrolyte can be an alkaline solution and preferably contains an excess of a substance containing the active metal (e.g. zinc oxide). The zinc oxide may fully saturate the solution (as zincate) and the latter can be in equilibrium with a solid phase of this substance to maintain the saturated condition. It has been found that the dendritic bridges which normally develop in the cells can be obviated if the system includes a drive means, such as an electric motor 10f whose shaft 10g is coupled with the disk-shaped current collector 10a forming the reversible electrode member. With zinc/zinc-oxide active material and an aqueous potassium-hydroxide electrolyte, a disk electrode without a wiper (FIG. 3) and having a diameter of about 5 cm. can be effectively provided with a smooth and uniform deposit of the active material when the angular velocity of the disk ranges between 100 and 1400 revolutions per minute; in fact it has been found that velocities in excess of about 200,000 cm. per minute and as low as about 250 cm. per minute ensure a uniform deposit free from the nonuniform densification characterizing conventional systems and obviate the formation of shorting bridges. The motor 10f may be operated, according to this invention, only during charging and also serves to break any dendritic bridges which may form during the initial moments of such charging when commencement of rotation lags behind charging. It is, however, also possible to rotate the disk continuously during both charging and discharging of the cell.

It is also possible, under similar operating conditions, to form dendritic or filamentary deposits of tin. Moreover, lithium can yield microcrystalline and somewhat dendritic deposits from a nonaqueous medium (e.g. lithium chloride and propylene carbonate mixtures) which are tenacious and suitable for use in electric accumulators.

Figure 2:
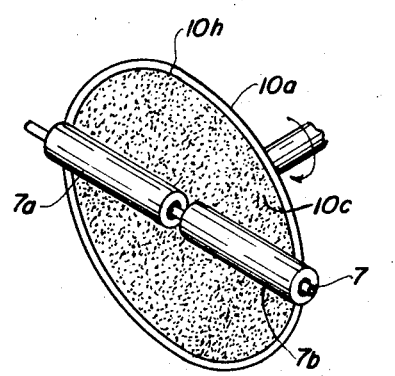
FIG. 2 is a perspective view of the electrode and the smoothing device drawn to a reduced scale.

As indicated earlier, it is possible to obtain a relatively dense layer at lower speeds by compacting it against the surface of the reversible electrode as described in said copending application of Z. Stachurski and thus deflecting the dendrites from their normal growth direction (transverse to the surface and toward the juxtaposed electrode) into an orientation in which the dendrites lie at least in part along the surface. The densified layer is relatively smooth and is desirable because it admits of higher discharge rates than a nondensified layer deposited at low electrode speeds. Thus, the rotating electrode 10a (FIG. 2) can cooperate with wiper means for deflecting the dendrites by mechanical engagement with the layer. The deflecting means can include one or more wipers in the form of elastic tubes 7a, 7b (FIG. 2) freely rotatable on and held in place by, for example, a rod 7 and engaging the layer 10c deposited upon the disk 10a. In FIG. 3, the tube 9 performing this function is corrugated and of undulating configuration at 9a and is nonrotatable while being elastically deformable to smooth, densify and corrugate the layer. As seen in FIG. 2, the periphery 10h of the disks is insulated, for example, by insulating tape, a flexible rubber channel or the like extending axially beyond the layer so as to control and frame the growth area thereof. Moreover, the active electrode can be generally drum-shaped with a cylindrical deposition surface if desired.

Figure 1:
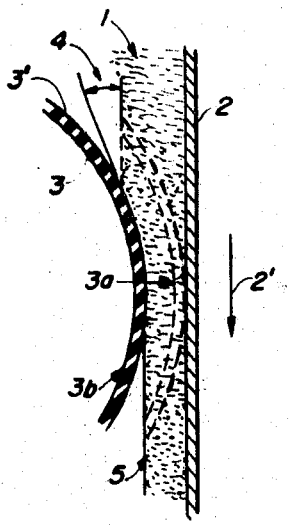
FIG. 1 is a diagrammatic sectional view of a disk electrode, showing a smoothing means co-operating therewith.

The deflection is illustrated in greater detail somewhat schematically in FIG. 1, wherein the zinc dendrites 1 are seen to grow generally transversely to the electrode surface 2 which is displaceable in the direction of arrow 2' via the drive means described above or any of those discussed hereinbelow. The tube or wiper 3 is composed of an elastic material and thus bears resiliently upon the dendritic layer 1 while having a layer-engaging face 3' arcuately convex in the direction of the layer and including an acute angle 4 therewith. It will be seen that the direction of dendritic growth is changed as the dendrites are deflected toward the surface 2 and the layer is compacted. Upon initiation of dendrite deposition, the tube 3 occupies the position shown at 3a in dot-dash lines and is resiliently compressed during build-up of the layer 5 to its solid-line position 3b.

In FIG. 4, there is shown an electrochemical system embodying the present invention and employing an air-depolarized counterelectrode. In this arrangement, the housing 8 encloses a disk 12 which forms the electrochemically reversible anode as described with reference to FIG. 3. The drive means includes a motor 11 whose shaft 11a is coaxial with the disk and affixed thereto while a liquid seal 11b is provided between a stationary terminal sleeve 11c and the rotating shaft 11a, this seal containing mercury or some other conductive liquid whereby the anode terminal sleeve 11c is connected with the disk 12. The disk 12 is juxtaposed with an auxiliary screen electrode 14 against which the reversible electrode 12 can be charged and which maintains an ion-migration path from the reversible electrode to an air-depolarized electrode 15 which is separated from the auxiliary electrode by a sheet of porous nonwoven fabric 11d resistant to deterioration in the electrolyte. This fabric can be composed of polymeric fiber and be of the type marketed under the trade name Pellon. A system of this general character, wherein a reticulate electrode 14 is disposed between a gas-permeable depolarized electrode 15 and the reversible electrode 12, is described and claimed in the copending application Ser. No. 125,779 filed July 21, 1961, mentioned above. The porous electrode 15 and the housing 8 enclose a compartment for an alkaline electrolyte 11e, the compartment being maintained at slightly reduced pressure at 17 to counteract the hydrostatic pressure tending to flood the pores of the electrode 15 with electrolyte.

It should be noted that the use of a reduced pressure to resist the tendency of the electrolyte to flood the pores of the gas-depolarized electrode material may not be required if the gas-depolarized member evidences no tendency toward such flooding. The use of hydrophobic resins in the body of a gas-depolarized electrode has markedly decreased such tendencies and has led to the maintenance of gas channels therein without the need for other means to ensure the availability of the three-phase menisci over considerable regions of the gas-depolarizable electrode. While reference has been made to oxygen or air as the depolarizing gas, it will be understood that other conventional gaseous depolarizers (e.g. chlorine) can be employed. When fluorine is employed, however, in combination with lithium as the active material, the energy density of the lithium/fluorine couple can be obtained. The active electrode can sustain a reaction in which the active material is continuously supplied to the interface. Quinone can thus be reduced at the active electrode fdom a buffer solution on discharge while hydroquinone is oxidized on the active electrode during charge. The movement of the electrode decreases the diffusion layer and increases the current density of the electrode reaction.

The rear side of this electrode is aligned with a filter 16 adapted to demove carbon dioxide from the air supplied to the porous electrode. A suitable filter can consist of a sheet of filter paper capillarily wetted by a bath 16a of potassium hydroxide. It was found that this cell could be operated without a wiper over a large number of cycles by rotating the disk 12 during charging against the auxiliary electrode 14 (i.e. while zinc is plated on the disk) and thereafter discharging the electrode, with the disk stationary, against the air-depolarized electrode for a large number of cycles without any material loss of capacity of the anode. A high-rate rotation of 100 to 1400 r.p.m. with a disk of 5 cm. diameter was used.

The gas-depolarized cell can be fully enclosed in a canister or other receptacle R whose volume may be such that it contains all of the gaseous depolarizer necessary for the subsequent discharge, the gas being produced and retained in the sealed system during charge and stand. If, for space considerations, the receptacle R must be smaller than the required volume, it may be connected by an umbilical tube U with a tank T, constituting the remainder of the necessary volume. The receptacle R and tank T are hermetically sealed.

In general, speeds of 100 to 5000 r.p.m. were effective with a reversible electrode disk of 5 cm. in diameter with an active area of about 13 cm.$^2$. The counterelectrode was a porous oxygen electrode consisting essentially of a noble-metal cataylst and a hydrophobic agent (e.g. polytetrafluorethylene) while the wide-mesh auxiliary electrode was composed of nickel. The electrolyte was a 35% aqueous solution of potassium hydroxide saturated with zinc oxide and in equilibrium with solid zinc oxide. At a speed of about 800 r.p.m. the cell was charged to a capacity of 0.2 ampere hours per cm.$^2$ at the rate of 0.015 ampere per cm.$^2$ and discharged at 0.04 ampere per cm.$^2$ and 0.9 volt. An adherent uniform deposit of dendritic zinc was found at the active electrode and there was no tendency toward bridging with a counterelectrode spaced several millimeters from the active electrode.

In FIGS. 5 and 6, there is shown another air-depolarized electrochemical system employing a rechargeable electrode according to the invention. In this system, the porous oxygen electrodes 19 are paired and form between them electrolyte compartments 19a in which the rechargeable-electrode disks 18 are rotatably journaled upon pins 20 which are insulated from the associated gas-depolarized electrodes 19 but electrically contact corresponding electrodes of subjacent cells via their outer surfaces 20a which engage contact members 19b of those adjacent cells so that the respective cells are connected in series. The disks 18 are driven by respective drive gears 23 meshing with the masked or insulated peripheries 18a of the disks. The drive means 22 can be a motor whose shaft 22a carries the gears 23 which are composed of insulating material and received within a hood 24a overlying the housing 25a and communicating with the compartments 19a. An outlet 24 of the hood 24a can be connected to a suction source for reducing the tendency of the electrolyte to flood the pores of the electrodes 19; the housing 25a can have openings 25 spanned by the decarbonation filters 25b through which air is admitted to the spaces between the porous electrodes 19.

Figure 7:
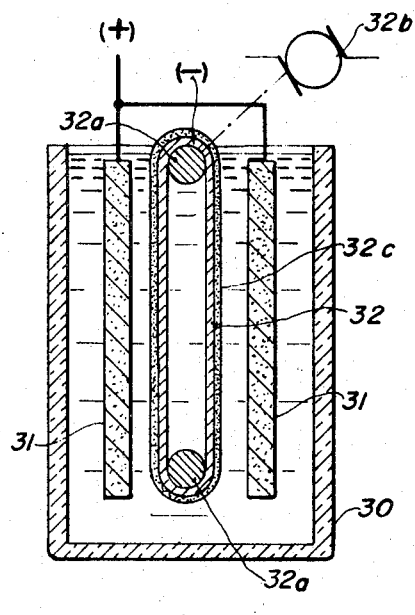
FIG. 7 is a side-elevational view, partly broken away, of a modified battery using a band-type movable electrode member.

In FIG. 7, the housing 30 encloses a pair of rechargeable counterelectrodes 31 disposed on opposite sides of a moving rechargeable anode 32 in the form of a band passing over rollers 32a driven by a motor 32b. The deposit of dendritic zinc 32c upon this band can be compacted by a pair of fixedly positioned tube-like wipers in the manner previously described although, for the purposes of the present invention, the electrode can merely be displaced at a rate sufficient to produce a uniform and dense deposit. In this case, the movable electrode member is linearly displaceable in its plane.

Figure 8:
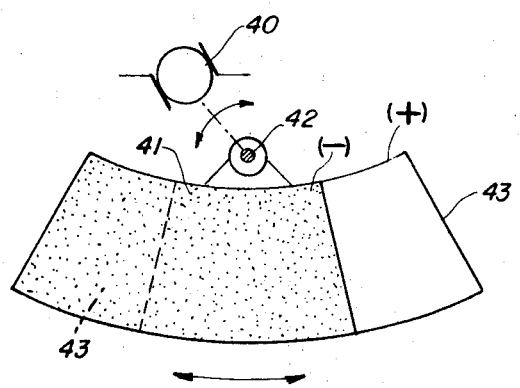
FIG. 8 is a view similar to FIG. 7, diagrammatically illustrating a system having an oscillatable electrode.

In the arrangement of FIG. 8 the drive motor 40 is a source of angular oscillations and is coupled with the sector-shaped reversible electrode 41 journaled by the shaft 42 to the housing (not shown). Two counterelectrodes 43 are alignable with the rechargeable electrode 41 in at least one position thereof.

Figure 9:
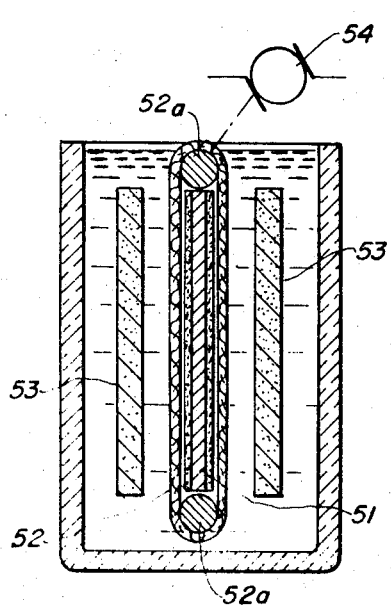
FIG. 9 is a view similar to FIG. 7 of a battery according to the invention wherein an intermediate member is movable.

In the system of FIG. 9, neither the rechargeable electrode member 51 nor the counterelectrode 53 are movable, but a woven-fabric band 52 constitutes a movable member interposed between the electrodes and can serve as an intermediate member for controlling the dendritic growth. The band 52 is carried on rollers 52a and is displaced by a drive motor 54 while effecting a pumping action which destroys the concentration gradient tending to form in the electrolyte at least in the region of the rechargeable electrode. The fabric band, e.g. of nylon, can be replaced by a wire mesh when the intermediate member is to be constituted as an auxiliary electrode for charging the zinc/zinc-oxide electrode 51.

Figure 10:
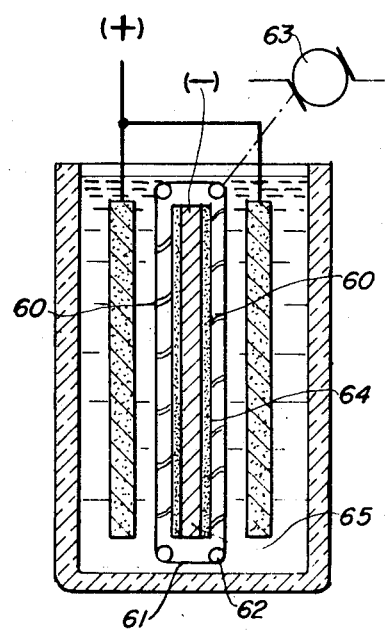
FIG. 10 is a similar view of another embodiment of the invention.

In the system illustrated in FIG. 10, a plurality of wiper blades 60 are carried by a pair of endless cords 61 at their opposite extremities, these cords being displaced over pulleys 62 by a motor 63. The blades 60 form acute angles with the layer 64 of the stationary rechargeable electrode 65 and can also serve as liquid-pumping vanes.

The invention as described and illustrated admits of various modifications within the ability of persons skilled in the art without departing from the spirit and scope of the invention as defined in the appended claims.

We claim:
1. In the operation of a rechargeable electrochemical current generator with a negative electrode and a positive electrode having generally planar confronting working surfaces immersed in an electrolyte, said negative electrode containing an active material soluble in said electrolyte and prone to develop growth formations extending toward said counterelectrode during charge, the improvement which comprises the step of charging said generator with continuous displacement of said electrodes in said electrolyte with reference to each other in a plane parallel to their working surfaces while continuously rolling the working surface of said negative electrode with a solid deflector, to compact and smooth incipient growth formations unto the working surface.

2. The improvement defined in claim 1, for use with coaxial disk electrodes, wherein said electrodes are relatively displaced by rotation about their common axis.

3. The improvement defined in claim 2 for use with closely spaced electrodes having a maximum distance of about 2 cm. between said working surfaces, wherein said positive electrode is held stationary in said electrolyte and said negative electrode is rotated at a rate between substantially 100 and 1400 revolutions per minute, said active material being zinc and said electrolyte being alkaline.

References Cited

UNITED STATES PATENTS

| 543,372 | 7/1895 | Boettcher | 136—31 |
| 543,680 | 7/1895 | Epstein | 136—31 |
| 1,436,616 | 11/1922 | Walsh | 136—141 |
| 1,575,084 | 3/1926 | Walsh | 136—141 |
| 2,886,620 | 5/1959 | Barrett | 136—34 |
| 719,659 | 2/1903 | Halsey | 136—141 |
| 873,220 | 12/1907 | Edison | 136—28 |
| 3,115,427 | 12/1963 | Rightmire | 136—86 |
| 3,266,937 | 8/1966 | Lyons | 136—86 |
| 3,275,475 | 9/1966 | Cohn | 136—86 |
| 3,276,909 | 10/1966 | Moos | 136—28 |
| 3,432,354 | 3/1969 | Jost. | |

FOREIGN PATENTS

| 8,345 | 1906 | Great Britain | 136—31 |
| 13,336 | 1893 | Great Britain | 204—49 |
| 15,257 | 1893 | Great Britain | 136—141 |
| 6401451 | 8/1964 | Netherlands | 136—31 |
| 8,497 | 1886 | Great Britain | 136—86A |

ALLEN B. CURTIS, Primary Examiner

U.S. Cl. X.R.

136—86, 141